(12) United States Patent
Thakkar et al.

(10) Patent No.: US 12,164,478 B2
(45) Date of Patent: Dec. 10, 2024

(54) MAP REDUCE APPROACH TO CALCULATING SIMILARITY MATRIX USING A DICTIONARY DATA STRUCTURE IN DDFS SCALE OUT ARCHITECTURE

(71) Applicant: Dell Products L.P., Round Rock, TX (US)

(72) Inventors: Smriti Thakkar, San Jose, CA (US); Tony T. Wong, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/813,222

(22) Filed: Jul. 18, 2022

(65) Prior Publication Data

US 2024/0020274 A1 Jan. 18, 2024

(51) Int. Cl.
| | | |
|---|---|---|
| G06F 16/174 | (2019.01) | |
| G06F 16/14 | (2019.01) | |
| G06F 16/182 | (2019.01) | |
| H04L 67/1097 | (2022.01) | |

(52) U.S. Cl.
CPC ........ G06F 16/1748 (2019.01); G06F 16/152 (2019.01); G06F 16/182 (2019.01); H04L 67/1097 (2013.01)

(58) Field of Classification Search
None
See application file for complete search history.

(56) References Cited

U.S. PATENT DOCUMENTS

| | | | | |
|---|---|---|---|---|
| 9,449,011 | B1 * | 9/2016 | Chen | G06F 16/1748 |
| 10,303,797 | B1 * | 5/2019 | Menezes | G06F 16/1727 |
| 2019/0332492 | A1 * | 10/2019 | Marelas | G06F 16/137 |
| 2020/0363963 | A1 * | 11/2020 | Patwardhan | G06F 3/0619 |
| 2020/0363972 | A1 * | 11/2020 | Krasner | G06F 3/0641 |
| 2021/0360088 | A1 * | 11/2021 | Ponnala | H04L 67/1097 |
| 2022/0083513 | A1 | 3/2022 | Wong et al. | |
| 2022/0197755 | A1 | 6/2022 | Thakkar et al. | |

OTHER PUBLICATIONS

NetApp. "What is Data Deduplication?" Oct. 25, 2020 snapshot via Archive.org. URL Link: <https://www.netapp.com/data-management/what-is-data-deduplication/>. Accessed Jan. 2024. (Year: 2020).*
Adams, Ryan P., "Hierarchical Clustering", COS 324—Elements of Machine Learning, Course Notes, Princeton University, Nov. 13, 2018, 11 pages (https://www.cs.princeton.edu/courses/archive/fall18/cos324/files/hierarchical-clustering.pdf).

\* cited by examiner

*Primary Examiner* — Irene Baker
(74) *Attorney, Agent, or Firm* — Workman Nydegger

(57) ABSTRACT

One example method includes receiving at a worker node, from each deduplication filesystem (DDFS) node in a group of DDFS nodes, respective parts of a fingerprint-file object dictionary, wherein each of the parts is created using a common fingerprint mask, merging, by the worker node, the parts, scanning the merged parts to update an intersection count between file objects stored at the DDFS nodes, generating, based on the scanning, an intersection matrix, and transferring the intersection matrix to a master node.

16 Claims, 7 Drawing Sheets

| | $F_1$ | $F_2$ | $F_3$ | ... | $F_{M-1}$ | $F_M$ |
|---|---|---|---|---|---|---|
| $F_1$ | - | $J(F_1,F_2)$ | $J(F_1,F_3)$ | $J(F_1,..)$ | $J(F_1,F_{M-1})$ | $J(F_1,F_M)$ |
| $F_2$ | - | - | $J(F_2,F_3)$ | $J(F_2,..)$ | $J(F_2,F_{M-1})$ | $J(F_2,F_M)$ |
| $F_3$ | - | - | - | $J(F_3,..)$ | $J(F_3,F_{M-1})$ | $J(F_3,F_M)$ |
| ... | - | - | - | - | $J(..,F_{M-1})$ | $J(..,F_M)$ |
| $F_{M-1}$ | - | - | - | - | - | $J(F_{M-1},F_M)$ |
| $F_M$ | - | - | - | - | - | - |

MAP REDUCE APPROACH TO CALCULATING SIMILARITY MATRIX USING A DICTIONARY DATA STRUCTURE IN DDFS SCALE OUT ARCHITECTURE

FIELD OF THE INVENTION

Embodiments of the present invention generally relate to data deduplication. More particularly, at least some embodiments of the invention relate to systems, hardware, software, computer-readable media, and methods for creating a similarity matrix, and using the similarity matrix to enable effective and efficient use of resources when performing data deduplication operations in a scale out architecture.

BACKGROUND

In some data protection platforms that employ a scale out architecture, the Dell EMC Data Domain platform is one example, multiple nodes in the cluster share a global namespace. Backup clients back up their data to "file objects" which are logical collection of files within a single node. A "file object" is assigned to a specific node on creation.

Data deduplication, or simply 'deduplication,' typically occurs within a single node. Data is not shared across nodes. If two file objects on different nodes are similar, they cannot share their common data. Compared to a super single node server, the global scale architecture cannot deliver the same level of data deduplication.

A related problem is that the distributed resources, such as memory, storage, and processing for example, of the global scale architecture are not employed in an effective and efficient manner in performing deduplication processes.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
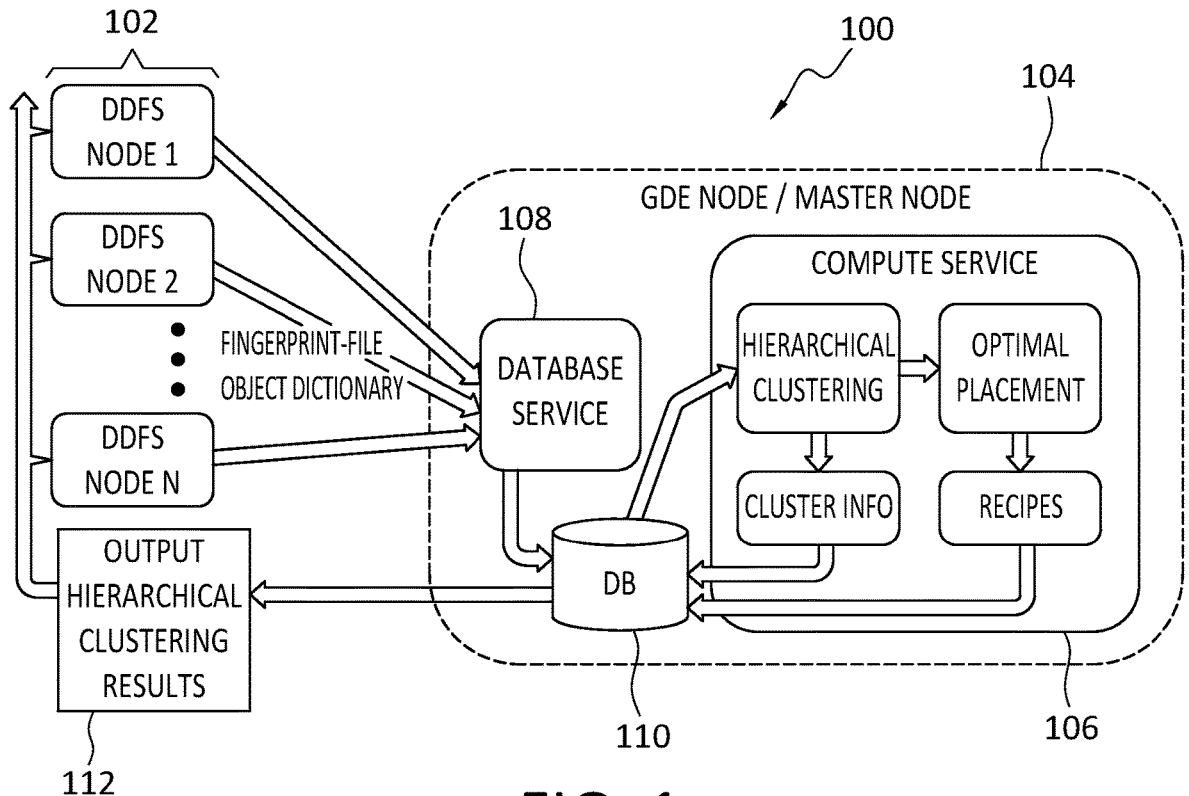
FIG. 1 discloses aspects of an architecture that includes a group of DDFS nodes and a master node.
FIG. 2 discloses aspects of an example Jaccard similarity matrix.

Embodiments of the present invention generally relate to data deduplication. More particularly, at least some embodiments of the invention relate to systems, hardware, software, computer-readable media, and methods for creating a similarity matrix, and using the similarity matrix to enable effective and efficient use of resources when performing data deduplication operations in a scale out architecture.

In general, some example embodiments of the invention may operate to improved global deduplication performance in a scale out architecture. For example, embodiments may operate to improve global deduplication and find similar file objects by running an agglomerative hierarchical clustering algorithm taking inputs from a group of deduplication filesystem (DDFS) nodes. To this end, embodiments may operate to calculate a similarity matrix. In more detail, the similarity matrix may be calculated based on respective intersection matrices generated at each of a group of worker nodes, based on input received by the worker nodes from the DDFS nodes. The intersection matrices may then be merged, such as at a master node, to produce the similarity matrix. The similarity matrix may be an input to an agglomerative hierarchical clustering algorithm and the output of this algorithm may be a hierarchy of similar file objects. These similar file objects may then be deduplicated by, and/or at the direction of, a master node.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, an embodiment of the invention may enable workload distribution within a scale out data deduplication architecture. An embodiment may operate to improve data deduplication performance, relative to environments in which parallel processing is not performed. Further, an embodiment may enable scaling up of a data deduplication scale out architecture. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Embodiments may operate to improve global deduplication and find similar file objects by running an agglomerative hierarchical clustering algorithm taking inputs from all nodes. In this approach, embodiments may calculate a similarity matrix which is an input to the agglomerative hierarchical clustering algorithm and the output is a hierarchy of similar file objects.

More particularly, example embodiments may operate to calculate an input similarity matrix, for example, a Jaccard similarity matrix, from the fingerprint-file_object dictionary data structure in a multi-node architecture in a map-reduce approach. This approach may comprise, for example, (i) partitioning the fingerprint-file_object dictionary data structure, thereby effectively distributing memory across W worker nodes, and (ii) processing the partitioned smaller fingerprint-file_object dictionary on the worker nodes and generating a summarized result. The results may then be forwarded by the worker nodes to the master node, which may then merge the results and run the hierarchical clustering algorithm.

Some possible advantages of a map-reduce approach may include, but are not limited to: (1) distribution of memory usage across 'W' worker nodes; (2) implementation of parallel processing by distributing compute across W worker nodes; (3) reduction of data transfer over the network to the master node; (4) low overhead requirement for resumption of failed jobs on the split data set; and (5) implementation of a scalable solution, in which the number of worker nodes may be scaled up, or down, proportionally to the addition of DDFS nodes to the scale out architecture.

B. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B.1 Basic Architecture

With particular attention now to FIG. 1, one example of an operating environment for embodiments of the invention is denoted generally at 100. In general, the operating environment 100 may include a group of DDFS nodes 102 that may communicate with a master node 104 that may comprise a deduplication engine 106, such as a DataDomain GDE (global deduplication engine). The deduplication engine 106 may run in its own container, which may take any of a variety of forms, including a local VM, a remote VM, or a microservice running in a cloud environment as shown in FIG. 1.

The deduplication engine 106 may be totally decoupled from the file system, that is, the DDFS nodes 102. Particularly, and as shown in the example of FIG. 1, the deduplication engine 106 may operate in connection with a database service 108 that may administer, and use, a database 110 with which the deduplication engine 106 may communicate.

Each of the nodes 102 may comprise a respective instantiation of DDFS which may communicate with the master node 104 via, for example, an asynchronous database protocol. In general, each of the nodes 102 may write, using an API (application program interface) for example, the fingerprint-file object dictionary data structures which may be received by the database service 108 and written to the database 110. The master node 104 may periodically poll the nodes 102 and trigger the analytic engine to generate a similarity matrix and run an agglomerative hierarchical clustering to generate the hierarchical clustering results 112, and output the hierarchical clustering results 112 to the nodes 102.

B.2 Jaccard Similarity, Hierarchical Clustering Algorithm and Dendrogram

For file objects, each file may be a collection of data segments, or simply 'segments.' In the deduplication file system, each segment may be identified by a SHA1 fingerprint and therefore a file can be viewed as a collection of these SHA-1 (secure hash algorithm 1) fingerprints. There is no equivalent distance function between 2 fingerprints, that is, the fingerprints are either the same or different. However, the similarity between two files may be defined as the Jaccard coefficient $J(X,Y)=|X \cap Y|/|X \cup Y|$, where $|X \cap Y|$ is the count, or size, of fingerprints common between file object X and Y, and $|X \cup Y|$ is the union count of all unique fingerprints of file objects X and Y. Thus, X and Y file objects are totally distinct from each other if $J(X, Y)=0$ and the X and Y file objects are totally the same as each other if $J(X, Y)=1$.

With reference now to the example of FIG. 2, which discloses a Jaccard similarity matrix 200 for M file objects 'F,' the clustering algorithm according to some embodiments may require the similarity matrix where the i-j th entry is the Jaccard index of file-object F_i and file-object F_j. If there are M file-objects in the system, as in the example of FIG. 2, then the similarity matrix is an M*M symmetric matrix.

B.3 Fingerprint-File Dictionary

Figure 3:
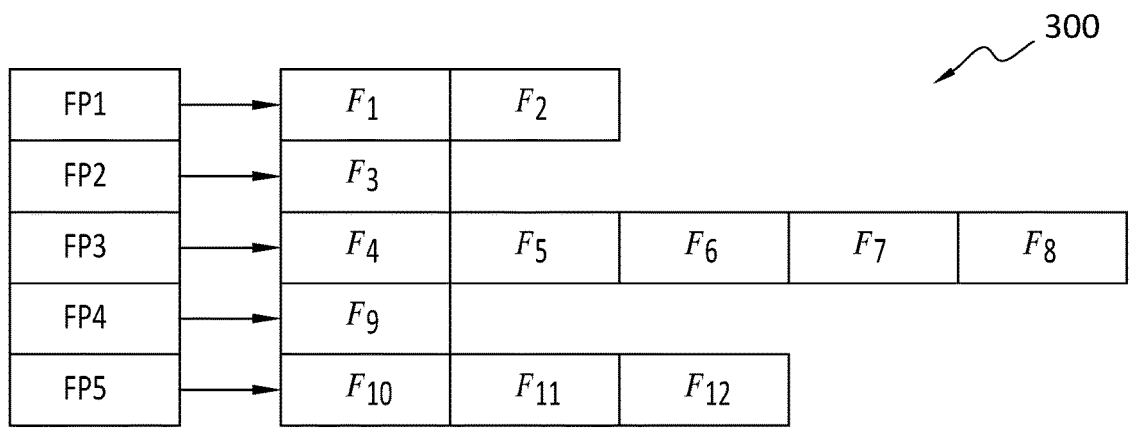
FIG. 3 discloses an example fingerprint dictionary according to some embodiments.

Instead of looking at file-objects pairwise and then comparing the fingerprints that belong to the file-objects, as in an inefficient brute force algorithm approach, example embodiments of the invention may implement a relatively more efficient data structure. This data structure may implement an inverse mapping, that is, fingerprint to file-object dictionary, where the key of the dictionary may be the fingerprint, such as a hash, of a data segment and the record in the dictionary may contain all the file-object IDs that share the fingerprint. An example of this is shown in the fingerprint dictionary 300 (fingerprint—file-object mapping) in FIG. 3. For example, it can be seen in FIG. 3 that the fingerprint FP1 corresponds to a data segment that can be found in both file object $F_1$ and file object $F_2$.

Note that it may be efficient for a GDE to compute the similarity matrix from this fingerprint-file dictionary 300. To compute the Jaccard similarity pairwise between file objects, only one scan of the fingerprint-object dictionary 300 may be needed. Particularly, assume that there are M file objects and N number of fingerprints in the dictionary 300. Let X be the similarity matrix of size M*M, and let S be an array of the fingerprint counts for each file object of size M. Both X and S may be initialized to 0s. Then the similarity matrix may be computed as follows:

(1) read the dictionary entries sequentially for each fingerprint key k—if the dictionary entry is the set $V_k=\{F_{k1}, F_{k2}, F_{k3}, \ldots F_{kn}\}$, then increment X[Fi, Fj] by 1 for each pair of entries $F_{ki}, F_{kj}$ in V and $k_i \ne k_j$;

(2) increment $S(F_i)$ by 1 for all the Fs (file objects) in the set $V_k$;

(3) when all the dictionary entries have been iterated, $X[F_i, F_j]$ will contain the number of fingerprints common to both $F_i$ and $F_j$; and (4) the Jaccard index $J[F_i, F_j]$, for $F_i$ and $F_j$ may be computed as: $J[F_i, F_j]=X[F_i, F_j]/(S[F_i]+S[F_j]-X[F_i, F_j])$—note that the matrices are symmetric, so either only the upper triangular matrix, or only the lower triangular matrix, need be computed.

B.4 Algorithm without Map Reduction and Split Dictionary

For the purposes of illustration and comparison with example embodiments, an example is presented here of an N node scale out architecture, for which the algorithm is not map-reduced. This illustrative algorithm may proceed as follows:

(1) generate N fingerprint-file dictionary data structure for each node (call OD this the DDFS worker nodes);

(2) transfer this via RPC protocol to the master GDE node;

(3) merge the N fingerprint-file dictionary into one global dictionary;

(4) scan the global dictionary to update the intersection count $X[F_i, F_j]$ between file-objects (F1 and F2) in an M*M matrix—update $S[F_i]$ and $S[F_j]$ as well;

(5) using the same M*M matrix, then update $X[F_i, F_j]=J[F_i, F_j]=X[F_i, F_j]/(S[F_i]+S[F_j]-X[F_i, F_j])$ to generate the Jaccard similarity matrix; and (6) using the Jaccard similarity matrix as input, run hierarchical clustering algorithm to generate similar file-object clusters on the GDE master node.

In this algorithm, the counts of fingerprints are used for simplicity, but accumulated fingerprint size may be used for improved accuracy. This is shown in FIG. 4.

Figure 4:
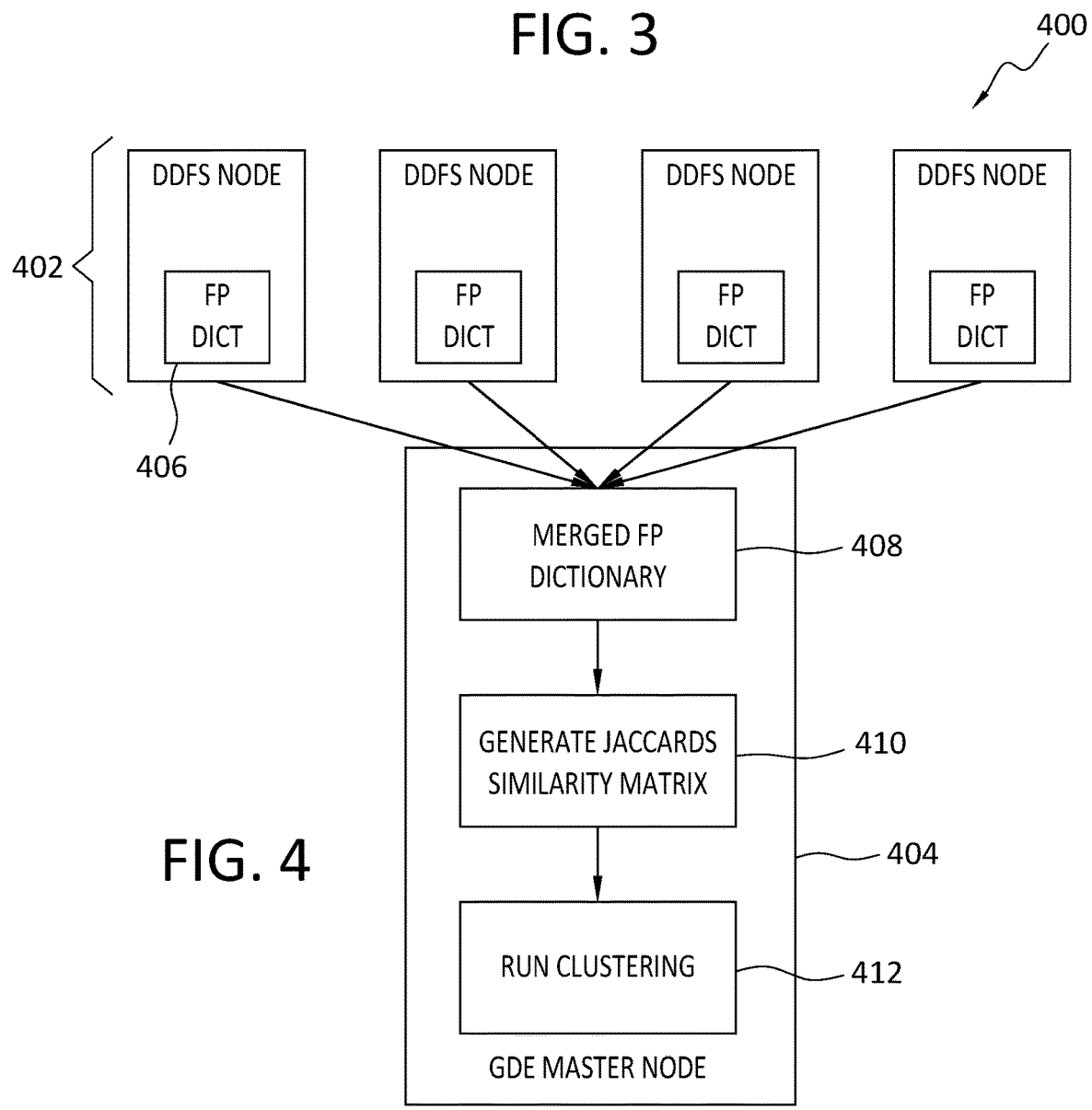
FIG. 4 discloses an example architecture that includes a group of DDFS nodes and a master node.

More specifically, FIG. 4 discloses a configuration 400 that comprises a group of 'N' DDFS nodes 402, each of which are configured to communicate with a GDE master node 404. Each of the DDFS nodes 402 may have, and/or generate, a respective fingerprint-file dictionary 406, and the 'N' fingerprint-file dictionaries 406 may be communicated by the DDFS nodes 402 to the GDE master node 404. The GDE master node 404 may then merge the N fingerprint-file dictionaries into one global dictionary 408. A Jaccard similarity matrix 410 may then be generated based on the global dictionary 408, and a hierarchical clustering algorithm 412 run to generate similar file-object clusters on the GDE master node 404.

C. Further Aspects of Some Example Embodiments

C.1 Fingerprint Masks

By way of contrast with the illustrative example just provided, example embodiments of the invention may generate and use fingerprint masks to split a fingerprint-file object dictionary into "N" parts. Aspects of some example embodiments that may employ this approach are set forth below.

In a deduplication filesystem, the fingerprints may be generated using SHA1, a well-known hashing algorithm. This hash function may ensure that the fingerprints generated are random and uniformly distributed. Embodiments may operate to divide the fingerprints into approximately 'N' equal parts by using a bitmask of "b" last bits of the fingerprint, where b=log n, where 'n'=N rounded to the next power of two. Note that, correspondingly, 'N' may also be the number of DDFS nodes that contribute respective portions to a fingerprint-file_object dictionary data structure.

When building a fingerprint-file_object dictionary data structure, embodiments may examine the fingerprint, and based on the value of [fingerprints last "b" bits modulo N] add it to the corresponding dictionary as the key. So, in the end, "N" fingerprint-file_object dictionaries may be built, each containing keys with the same fingerprint mask. Example embodiments may employ this method in a map-reduce approach to split the fingerprint-file_object dictionary.

Figure 5:
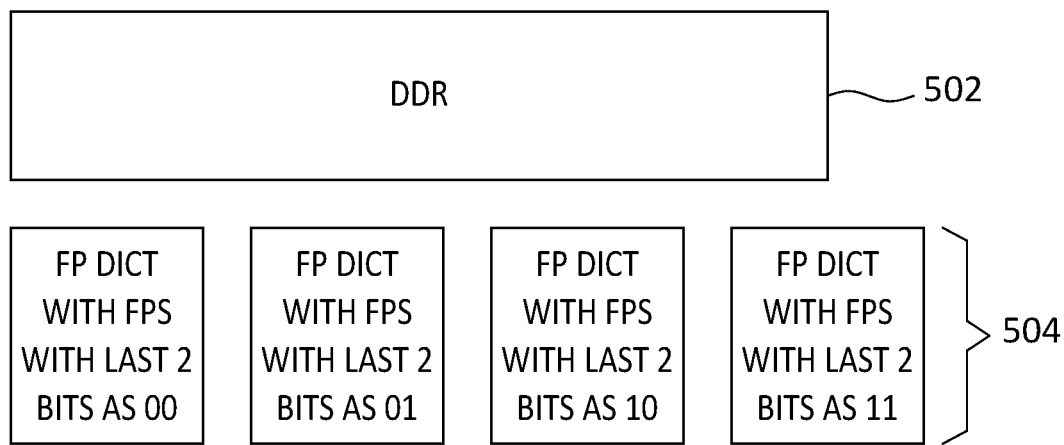
FIG. 5 discloses an example fingerprint file-object dictionary.

Consider, for example, a simple case where N=4. Then, 4=2^2. We can have a 2-bit fingerprint mask, that is, 00,01, 10,11. In this example, the fingerprint dictionary may be split, based on the value of the last two bits of the 20-byte dictionary fingerprint key, into 4 parts, one part on each of the DDFS nodes. This is shown in in FIG. 5, which discloses a fingerprint-file object dictionary 502 split into 4 parts 504 based on a 2-bit fingerprint mask.

C.2 Map-Reduce Approach

Figure 6:
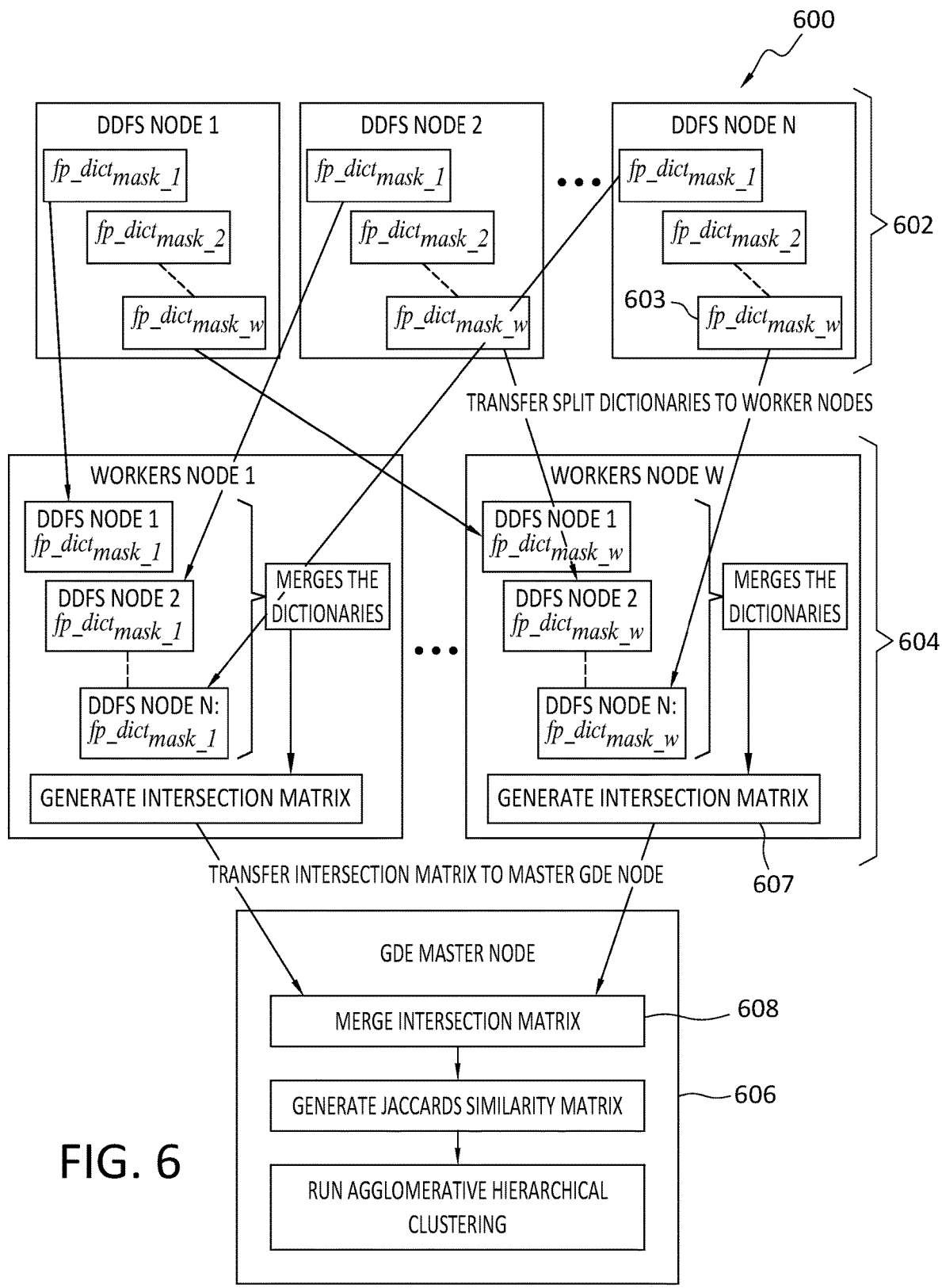
FIG. 6 discloses an example multi-tier architecture that includes DDFS nodes, worker nodes, and a master node.

With attention now to FIG. 6, details are provided concerning a map-reduce approach according to some example embodiments of the invention. In general, FIG. 6 discloses an example map-reduce approach to run clustering, that is, a map reduce approach to calculating a similarity matrix using a dictionary data structure in DDFS scale out architecture 600. As shown, the architecture 600 may comprise any number 'N' of DDFS nodes 602. Each of the DDFS nodes 602 may communicate with one or more worker 'W' nodes 604, and the worker nodes 604 may, in turn, each communicate with a GDE master node 606. Details concerning example operations of these various elements of the architecture 600 will now be provided in the context of the discussion of an example algorithm according to some embodiments of the invention.

An example algorithm according to some embodiments may proceed as set forth hereafter. In general, the algorithm may be performed by a combination of elements, such as the DDFS nodes 602, worker nodes 604, and the GDE master node 606. The algorithm may create a similarity matrix which may be used as an input to an agglomerative hierarchical clustering process which may operate to output a hierarchy of similar file objects. Because these file objects may be similar to each other, they may be more readily deduplicated than if the aforementioned clustering process had not been performed.

Example Algorithm (1) Identify W worker nodes 604—note that the DDFS nodes 602 may double up as worker nodes providing storage and compute, or worker nodes 604 may be independent VMs, containers or a microservices as shown in FIG. 4;
(2) On each DDFS node 602, generate split fingerprint-file_object dictionaries (fp_dict) 603 into W parts based on a fingerprint mask, examples of which are described elsewhere herein, particularly, every DDFS Node 602= [fp_dict$_{mask\_1}$], [fp_dict$_{mask\_2}$] . . . [fp_dict$_{mask\_w}$]—the split into "W" fp_dicts: (i) may ensure that there is a 1:1 mapping between the worker node 604 fp_dict to distribute compute operations equally across the worker nodes 604; and (ii) may be based on the fingerprint mask which ensures an approximately equal split, distributing memory equally across the worker nodes 604;
(3) the worker node 604 receives the fingerprint-file_object dictionary with the same mask from all the DDFS nodes 602 via RPC, or any well-known data transfer protocol—this may be expressed as worker node i 604=[fp_dict$_{mask\_i}$], from all DDFS nodes 602;
(4) merge the received same mask fingerprint-file object dictionary on each of the worker nodes 604—this may be expressed as worker node i 602=Merged [fp_dict$_{mask\_i}$], from all DDFS nodes 602;
(5) scan it to update the intersection count $X[F_i, F_j]$ between file-objects (F1 and F2) in an M*M matrix, and update $S[F_i]$ and $S[F_j]$ as well;
(6) the result on each worker node 604 is an intersection matrix X 607 of size M*M;
(7) transfer the M*M intersection count matrix X 607, and array S[F], from each of the worker DDFS nodes 604 to the master GDE node 606;
(8) on the master GDE node 606, merge the intersection matrix X 607, from all these nodes to generate merged matrix X_merged 608 of size M*M—where each entry in the matrix 608 may be calculated as follows: $X[i][j]_{merged} = X[i][j]_{worker\ node\ 1} + X[i][j]_{worker\ node\ 2} + \ldots + X[I][j]_{worker\ node\ W}$ (here, $X[i][j]_{merged}$ is the fingerprint intersection count between file object Fi and Fj);
(9) update S[Fi] as well, thus, $S[Fi]_{merged} = S[Fi]_{worker\ node\ 1} + S[Fi]_{worker\ node\ 2} + \ldots + S[Fi]_{worker\ node\ W}$;
(10) using the same M*M matrix, then update $X[F_i, F_j] = J[F_i, F_j] = X[F_i, F_j]/(S[F_i] + S[F_j] - X[F_i, F_j])$ to generate the Jaccard similarity matrix; and
(11) using the Jaccard similarity matrix as input, run the hierarchical clustering algorithm to generate similar file-object clusters on the GDE master node 606.

In the foregoing algorithm, counts of fingerprints are used for simplicity, but an accumulated fingerprint size may be used for improved accuracy.

C.3 Memory Comparison: Map-Reduce Approach and Comparison Example

Following is a comparison of memory requirements and memory distribution, between an example embodiment of a map-reduce approach, and the illustrative example referred to earlier. This comparison is provided only by way of example and is not intended to limit the scope of the invention in any way.

C.3.1 for the Purposes of the Comparison, Assume the Following Example System Configuration 1. Storage Capacity=1.5 PB capacity
2. Num fingerprints=400 million (assuming segment size=4 k, 1/1024 sampled fingerprints).
3. Fingerprint-file_object Dictionary size for 400 million keys (Assume 20 bytes fingerprint, 4 file-objects per entry represented by 2 bytes, assuming a hash table implementation an 8 byte pointer overhead)=(400 million*20)+(400 million*(4*2))+400 million*8=13 GB.
4. Fingerprint-file_object Dictionary size for 100 million keys (Assume 20 bytes fingerprint, 4 file-objects per entry represented by 2 bytes, assuming a hash table implementation and an 8 byte pointer overhead)=(100 million*20)+(100 million*(4*2))+100 million*8=3.25 GB.
5. Cluster size=12
6. Number of Worker nodes=4
7. Number of file objects=M=10000, 8 bytes for file_object id. Jaccard matrix=M*M*8=762 MB.

C.3.2 Memory Requirements for the Map-Reduce Approach

1. On each DDFS node: Total=13 GB—generate 4 fingerprint-object id dictionaries with 100 million keys each=4*3.23 GB=13 GB.
2. On each worker node: Total 79 GB
   a. transfer 3.25 from each of the 12 DDFS cluster nodes to the corresponding worker node=3.25*12=39 GB
   b. merged dictionaries=39 GB
   c. Scan the dictionaries to build an M*M intersection matrix=762 MB
3. On the GDE master node: Total=3 GB—transfer 762 MB matrix from each of the
4 worker nodes to the GDE master node=762*4=3 GB, and merge.

C.3.3 Memory Requirements for the Comparative Example

1. On each DDFS node: Total=13 GB—generate 1 fingerprint-object id dictionaries with 400 million keys each=13 GB.
2. On each worker node: Total=None
3. On GDE master node: Total=313 GB
   a. transfer 13 GB matrix from each of the 12 cluster nodes to the GDE master node=12*13~=156 GB
   b. generate merged dictionary=156 GB
   c. scan the merged dictionary to build an M*M intersection matrix=762 MB

C.3.4 Summary

Figure 7:
FIG. 7 discloses a table that compares memory requirements for various elements of some example architectures.

It can be seen from this section C.3, and the table 700 of FIG. 7, that a map-reduce approach, according to example embodiments, calculating a similarity matrix using a dictionary data structure in DDFS scale out architecture distributes memory across the worker nodes and improves parallel processing by distributing compute operations as well. As, and when, DDFS nodes are added, to scale up, workers nodes may be added as well. Thus, example embodiments may embrace a scalable solution to support Global Deduplication Engine in a scale out architecture.

D. Example Methods

Figure 8:
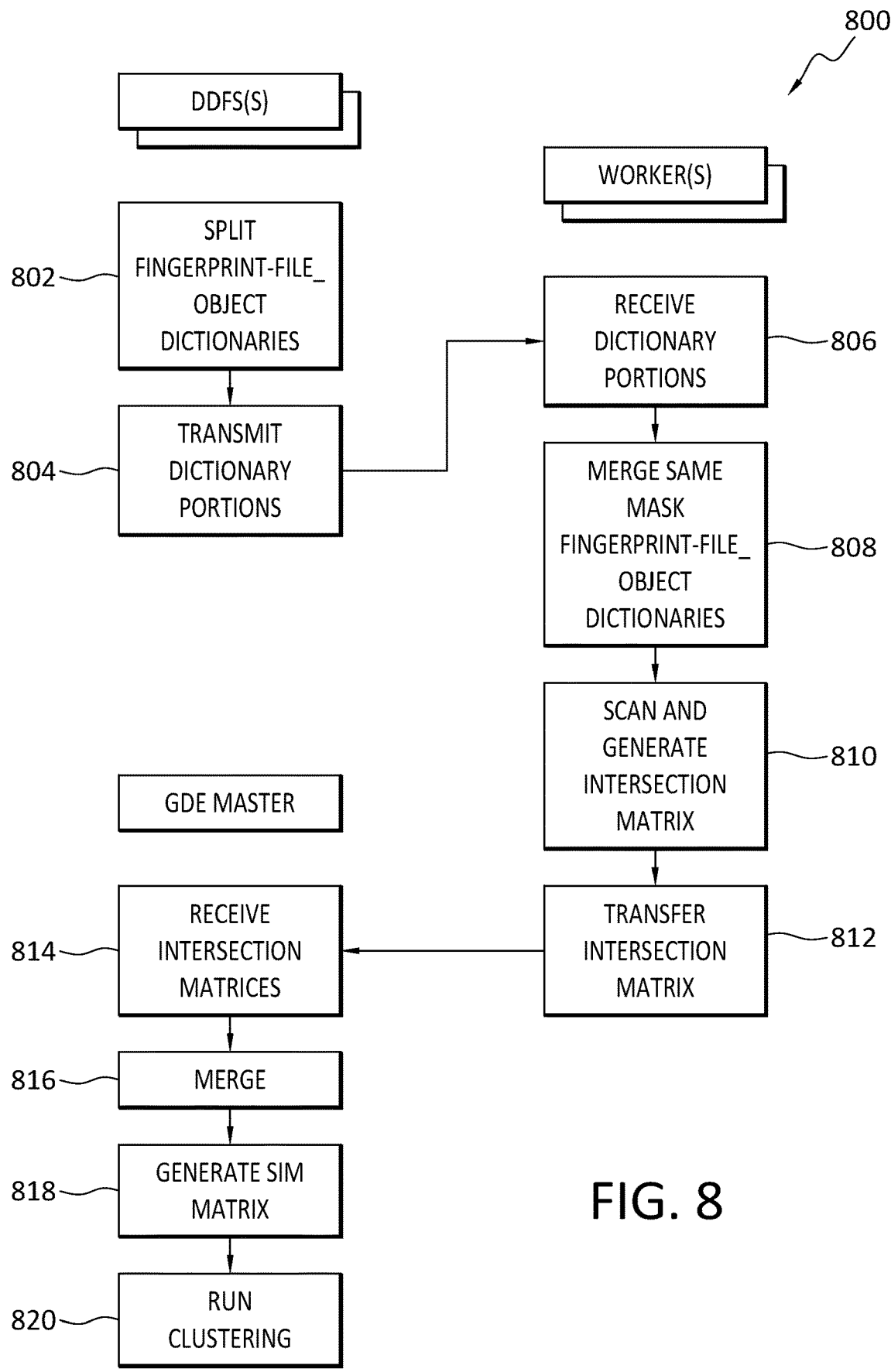
FIG. 8 discloses aspects of a method according to some example embodiments.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited. Further details concerning methods according to some example embodiments can be found in the discussion of FIG. 6 and the associated algorithm.

Directing attention now to FIG. 8, an example method according to some embodiments is denoted generally at 800. The method 800 may be performed in a data deduplication environment, one example of which may include one or more DDFS nodes, one or more worker nodes, and a GDE node. In some embodiments, a DDFS node may also function as a worker node. Any one or more of the elements of an operating environment may perform one or more of the functions disclosed herein, including in FIG. 8. No particular operating environment is necessarily required for any example embodiment. Finally, it is noted that various aspects of a method, such as the method 800, may be performed at each node of a group of DDFS nodes, at each node of a group of worker nodes, and/or at a GDE master node.

As shown in the example of FIG. 8, the method 800 may begin with the splitting 802, at each node in a group of DDFS nodes, a respective fingerprint-file_object dictionary, which may be referred to simply as a 'dictionary,' into parts. The splitting 802 may be performed with the use of a fingerprint mask, which may be the same for each of the DDFS nodes.

After the dictionaries have been split, the dictionary portions may be sent 804 to respective worker nodes. The worker nodes may then receive 806 the dictionary portions and merge 808 the same mask fingerprint-file_object dictionary portions, received from the various DDFS nodes, together.

The merged dictionary portions may then be scanned and used to generate an intersection matrix 810. The worker nodes may then transfer their respective merged dictionary portions 812.

The GDE master node may then receive 814 the respective intersection matrices provided by the worker nodes. The intersection matrices may then be merged together 816 by the GDE master node, and a similarity matrix, such as a Jaccard similarity matrix for example, generated 818 based on the merged intersection matrices. The similarity matrix may then be used as an input to a clustering process 820 that may operate to generate one or more clusters of similar file-objects.

E. Further Example Embodiments

Following are some further example embodiments of the invention. These are presented only by way of example and are not intended to limit the scope of the invention in any way.

Embodiment 1. A method, comprising: receiving at a worker node, from each deduplication filesystem (DDFS) node in a group of DDFS nodes, respective parts of a fingerprint-file object dictionary, wherein each of the parts is created using a common fingerprint mask; merging, by the worker node, the parts; scanning the merged parts to update an intersection count between file objects stored at the DDFS nodes; generating, based on the scanning, an intersection matrix; and transferring the intersection matrix to a master node.

Embodiment 2. The method as recited in embodiment 1, wherein the intersection matrix is combinable with one or more other intersection matrices to generate a similarity matrix.

Embodiment 3. The method as recited in embodiment 2, wherein the similarity matrix is usable by a hierarchical clustering algorithm to generate one or more clusters of similar file-objects.

Embodiment 4. The method as recited in embodiment 2, wherein the similarity matrix is a Jaccard similarity matrix.

Embodiment 5. The method as recited in any of embodiments 1-4, wherein the scanning, generating, and transferring, are performed by the worker node.

Embodiment 6. The method as recited in any of embodiments 1-5, wherein memory for performing the receiving, merging, scanning, generating, and transferring, is distributed amongst worker nodes in a group that includes the worker node.

Embodiment 7. The method as recited in any of embodiments 1-6, wherein the DDFS nodes in the group perform parallel processing of the fingerprint-file object dictionary.

Embodiment 8. The method as recited in any of embodiments 1-7, wherein an operating environment that includes the DDFS nodes, worker node, and master node, is scalable in terms of a number of DDFS nodes that are included in the operating environment.

Embodiment 9. The method as recited in any of embodiments 1-8, wherein each of the DDFS nodes operates independently of the other DDFS nodes in the group.

Embodiment 10. The method as recited in any of embodiments 1-9, wherein one of the DDFS nodes also functions in same way as the worker node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
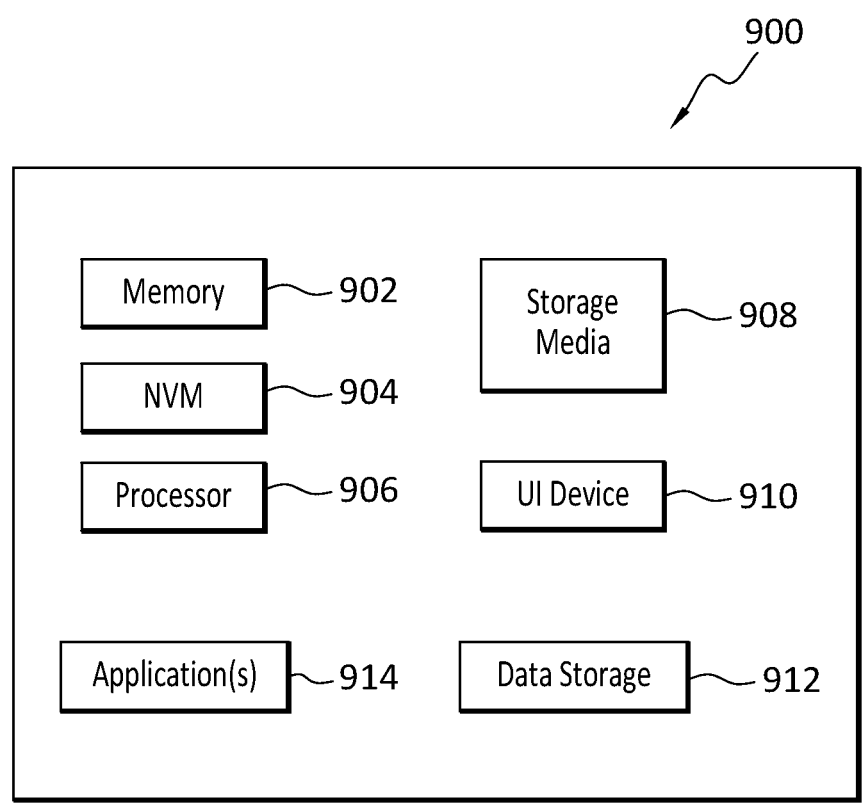
FIG. 9 discloses aspects of an example computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   splitting, by each deduplication filesystem (DDFS) node in a group of DDFS nodes, a fingerprint-file object dictionary into W parts based on W fingerprint masks, wherein each part contains keys with a respective fingerprint mask of the W fingerprint masks;
   receiving at an i-th worker node of W worker nodes, from each DDFS node, respective parts of the fingerprint-file object dictionary having a same i-th fingerprint mask of the fingerprint-file object dictionary, wherein the i-th fingerprint mask maps to the i-th worker node and i is an integer from 1 to W;
   merging, on each of the W worker nodes, the respective parts;
   scanning the merged parts to update an intersection count between file objects stored at the DDFS nodes;
   generating on each of the W worker nodes, based on the scanning, an intersection matrix;
   transferring intersection matrices from each of the W worker nodes to a master node;
   generating, by the master node, a similarity matrix based on the intersection matrices; and
   deduplicating, by the master node, similar file objects based on the similarity matrix.

2. The method as recited in claim 1, wherein the similarity matrix is usable by a hierarchical clustering algorithm to generate one or more clusters of similar file-objects.

3. The method as recited in claim 1, wherein the similarity matrix is a Jaccard similarity matrix.

4. The method as recited in claim 1, wherein memory for performing the receiving, merging, scanning, generating, and transferring, is distributed amongst the W worker nodes in a group that includes the worker node.

5. The method as recited in claim 1, wherein the DDFS nodes in the group perform parallel processing of the fingerprint-file object dictionary.

6. The method as recited in claim 1, wherein an operating environment that includes the DDFS nodes, the W worker nodes, and the master node, is scalable in terms of a number of DDFS nodes that are included in the operating environment.

7. The method as recited in claim 1, wherein each of the DDFS nodes operates independently of the other DDFS nodes in the group.

8. The method as recited in claim 1, wherein one of the DDFS nodes also functions in a same way as the worker node.

9. A non-transitory storage medium having stored therein instructions that are executable by one or more processors to perform operations comprising:
   splitting, by each deduplication filesystem (DDFS) node in a group of DDFS nodes, a fingerprint-file object dictionary into W parts based on W fingerprint masks, wherein each part contains keys with a respective fingerprint mask of the W fingerprint masks;
   receiving at an i-th worker node of W worker nodes, from each DDFS node, respective parts of the fingerprint-file object dictionary having a same i-th fingerprint mask of the fingerprint-file object dictionary, wherein the i-th fingerprint mask maps to the i-th worker node and i is an integer from 1 to W;
   merging, on each of the W worker nodes, the respective parts;
   scanning the merged parts to update an intersection count between file objects stored at the DDFS nodes;
   generating on each of the W worker nodes, based on the scanning, an intersection matrix;
   transferring intersection matrices from each of the W worker nodes to a master node;
   generating, by the master node, a similarity matrix based on the intersection matrices; and
   deduplicating, by the master node, similar file objects based on the similarity matrix.

10. The non-transitory storage medium as recited in claim 9, wherein the similarity matrix is usable by a hierarchical clustering algorithm to generate one or more clusters of similar file-objects.

11. The non-transitory storage medium as recited in claim 9, wherein the similarity matrix is a Jaccard similarity matrix.

12. The non-transitory storage medium as recited in claim 9, wherein memory for performing the receiving, merging, scanning, generating, and transferring, is distributed amongst the W worker nodes in a group that includes the worker node.

13. The non-transitory storage medium as recited in claim 9, wherein the DDFS nodes in the group perform parallel processing of the fingerprint-file object dictionary.

14. The non-transitory storage medium as recited in claim 9, wherein an operating environment that includes the DDFS nodes, the W worker nodes, and the master node, is scalable in terms of a number of DDFS nodes that are included in the operating environment.

15. The non-transitory storage medium as recited in claim 9, wherein each of the DDFS nodes operates independently of the other DDFS nodes in the group.

16. The non-transitory storage medium as recited in claim 9, wherein one of the DDFS nodes also functions in a same way as the worker node.

\* \* \* \* \*